Figure 5:
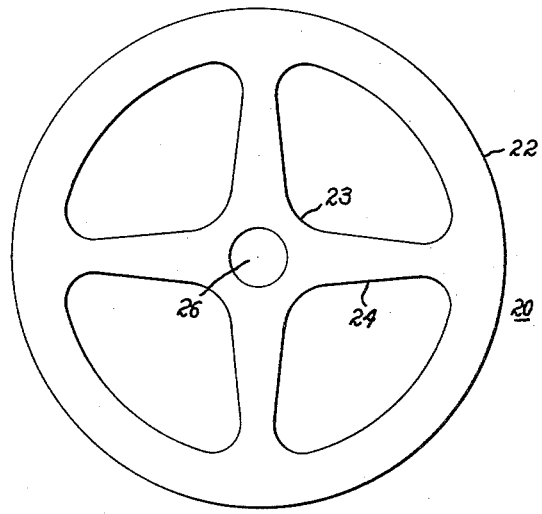

June 29, 1954  D. L. NICKLAS  2,682,280
INTERWOVEN EXHAUST VALVE
Filed Aug. 2, 1950  2 Sheets-Sheet 1
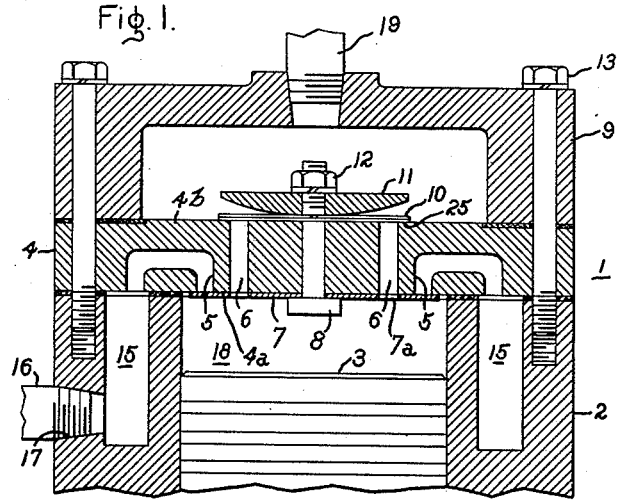
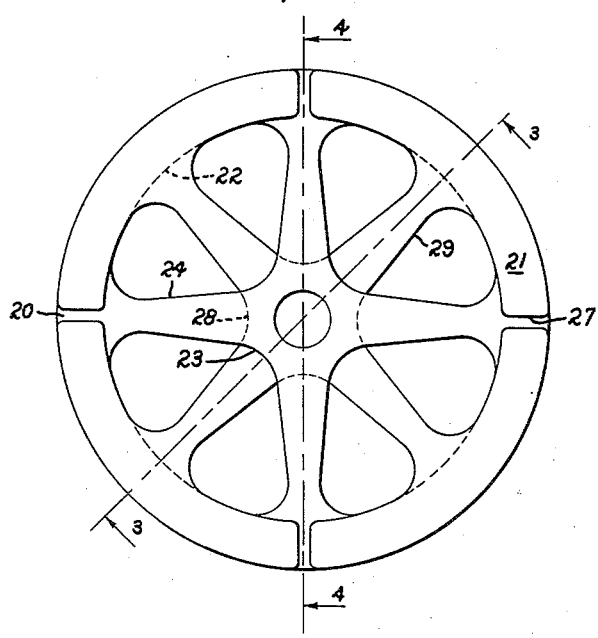
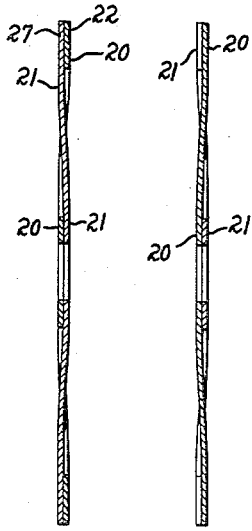
Inventor:
Donald L. Nicklas,
by Paul A. Frank
His Attorney.

June 29, 1954  D. L. NICKLAS  2,682,280
INTERWOVEN EXHAUST VALVE
Filed Aug. 2, 1950  2 Sheets-Sheet 2

Inventor:
Donald L. Nicklas,
by Paul A. Frank
His Attorney.

Patented June 29, 1954

2,682,280

UNITED STATES PATENT OFFICE 2,682,280

INTERWOVEN EXHAUST VALVE

Donald L. Nicklas, Schenectady, N. Y., assignor to General Electric Company, a corporation of New York Application August 2, 1950, Serial No. 177,217

1 Claim. (Cl. 137—512.15)

This invention relates to valves and, in particular, to a new and improved exhaust valve for high-speed compressors and pumps or the like.

While reference is made in this specification to a compressor, such reference is not intended to be a limitation on the scope of this invention, but rather has it been selected as an example to more clearly illustrate the operating principles of this invention.

In the high speed, high pressure ratio operation of a compressor, certain problems are encountered which are caused directly by the high speed operation. For example, in the operation of a compressor at 1,800 R. P. M., the exhaust valve that controls the flow of a compressed expansible fluid from a compression chamber to an exhaust manifold must open and close in a fraction of its 1/30 second cycle. This rapid opening and closing causes the valve to slap closed on a valve seat many times a minute and ordinary valves which were built to withstand the normal operating speed of a compressor at about 850 R. P. M. are not able to withstand this high-speed slapping on the valve seat; consequently, their fatigue limit is reached in a short time.

One of the solutions to this valve problem is to spring load the valve to limit the fluttering of the valve and to dampen the vibrations produced therein. Considerable care must be exercised in the selection of such a spring, however, since the mass of the valve and spring combination must be carefully controlled to prevent reduction of the volumetric efficiency of the machine. Specifically, if the valve and spring combination has too high a mass, there will be a lag in the opening and closing of the valve, which, in turn, will decrease the quantity of compressed fluid that passes the valve on each compression stroke, thus decreasing the volumetric efficiency.

In addition, a compressible fluid, after undergoing a compression ratio of about 16:1, is at such a high temperature that care must be exercised in the tempering of such a valve spring; otherwise, the temperature of the compressed fluid will remove the temper from the valve spring.

It is an object of this invention to provide a new and improved exhaust valve for a compressor.

It is a further object of this invention to provide a new and improved interwoven exhaust valve for a compressor that will withstand high temperatures and rapid cyclic opening and closing.

It is a still further object of this invention to provide a new and improved valve that dampens the fluttering of an exhaust valve during its opening in a normal compression stroke.

Further objects and advantages of this invention will become apparent and the invention will be more clearly understood from the following description referring to the accompanying drawings and the invention will be more particularly disclosed in the claim annexed to and forming a part of this specification.

Briefly, this invention comprises an annular valve secured by spoke-like struts to a central hub. A dished spring, having a shape analogous to that of the valve, and having a plurality of radial slits in the outer ring thereof, is interwoven with the valve to provide a new and improved combination for the exhaust valve of a compressor.

Figure 6:
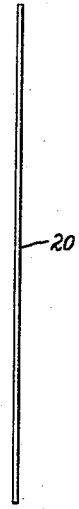
Figure 7:
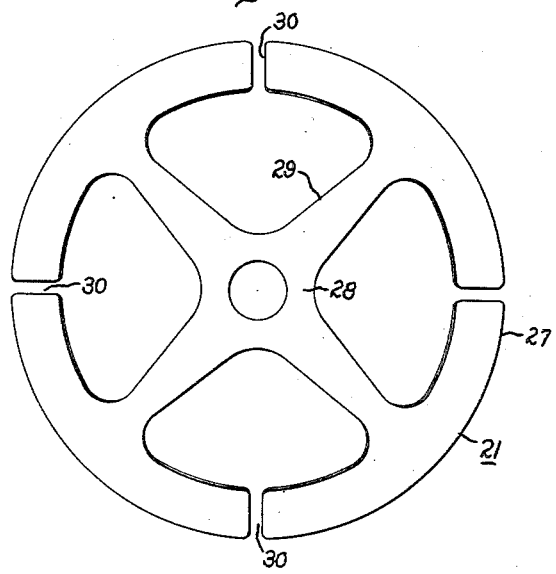
Figure 8:
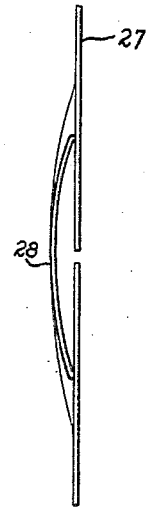

In the drawings, Fig. 1 is a sectional view of a compressor; Fig. 2 is a plan view of the interwoven exhaust valve; Fig. 3 is a sectional view through plane 3—3 of Fig. 2; Fig. 4 is a sectional view through plane 4—4 of Fig. 2 each in the direction of the arrows; Fig. 5 is a plan view of the valve itself; Fig. 6 is an end view of the valve shown in Fig. 5; Fig. 7 is a plan view of the new and improved spring for the valve; and Fig. 8 is an end view of the spring shown in Fig. 7.

Referring to the drawing, a compressor 1 is shown comprising a cylinder 2, a piston 3, a cylinder head 4 which defines a plurality of inlet ports 5 and outlet ports 6. In addition, there is an inlet valve 7 which covers the inlet ports 5. Inlet valve 7 is secured by a bolt 8 to the cylinder head 4. An exhaust manifold 9 is positioned above the cylinder head and houses an exhaust valve 10 and a guide 11, both of which are secured by a nut 12 to bolt 8. Manifold 9, in turn, is positioned on cylinder 2 by bolts 13 which pass through cylinder head 4 to secure both the manifold 9 and cylinder head 4 to cylinder 2.

Cylinder 2 is a substantially cylindrical-like wall defining an inlet passageway 15. A conduit 16, which is secured to cylinder 2 through a threaded opening 17, is in engagement with the inlet chamber 15. Inlet chamber 15 cooperates with inlet port 5 and cylinder head 4 to conduct a compressible fluid from inlet conduit 16 to inlet valve 7. Inlet valve 7 opens, as will hereinafter be described, to admit the compressible fluid into a compression chamber 18, which is defined by cylinder 2, cylinder head 4, and piston 3. Piston 3 is substantially a hollow cylinder-like member that closely engages the inner peripheral wall of cylinder 2, and is attached by means of connecting rod (not shown) to a crank shaft (not shown) which provides axial movement of piston 3 within cylinder 2.

Inlet valve 7 is a substantially flat circular plate defining openings 7a that permit the passage of compressed fluid through ports 6 to exhaust valve 10. Bolt 8 secures inlet valve 7 into engagement with the under surface 4a of cylinder head 4.

Inlet valve 7 deflects on the suction or downward stroke of piston 3 to allow the compressible fluid to pass from inlet ports 5 into the compression chamber 18.

The new and improved exhaust valve 10, which is hereinafter described, is positioned on the upper surface 4b of cylinder head 4 by a guide member 11 to limit the valve lift. Outlet valve 10 and guide member 11 are secured to bolt 8 by a nut 12. Exhaust valve 10 deflects in response to the pressure differential between manifold 9 and compression chamber 18. The compressible fluid, therefore, after entering into the compression chamber 18, is compressed by the upward stroke of piston 3 to create a pressure differential between the compression chamber 18 and manifold 9, which deflects exhaust valve 10 to force the compressed fluid through outlet ports 6 into manifold 9. On the next downward stroke of piston 3, when the pressure differential between manifold 9 and compression chamber 18 has been reversed, outlet valve 10 is closed and remains closed until the next compression stroke when the pressure differential is again reversed. An outlet conduit 19 is positioned in manifold 9 to lead away the compressed fluid.

Referring now particularly to Figs. 2, 3, and 4, exhaust valve 10 is shown as comprising a valve body 20 and a valve spring 21. The valve body is shown more particularly in Fig. 5 as being substantially circular metal disc having a rim 22 joined to a central hub 23 by a plurality of spokes 24. The valve body 20 is a flat sheet of steel or other material that will resist the high temperatures of the compressed elastic fluid that pass through the outlet ports 6 of the compressor. The rim 22 is of substantially rectangular cross section having particularly a flat bottom surface which engages a valve seat 25 defined by the upper surface 4b of head 4. The upper surface of rim 22 is substantially parallel to the bottom surface. The hub 23 is substantially the same thickness as the outer rim 25 and defines a central bore 26 through which bolt 8 passes, as has hereinbefore been described. The end view shown in Fig. 6 indicates the substantially uniform thickness of valve body 20. Valve spring 21, however, as shown in Fig. 7, comprises a substantially circular disk of a diameter equal to that of valve body 20 and having a rim portion 27, a central hub 28, and a plurality of spokes 29 that interconnect hub 28 and rim 27. The rim 27, however, is provided with a plurality of radial slits 30 which divide rim 27 into segments to give a variable periphery to allow for deflection of the rim 27 transverse to the plane of hub 28. As shown in Fig. 8, the central hub 28 is displaced from the plane of rim 27 to give a dish-like shape to the valve spring 21. Slits 30, in addition to allowing for the transverse movement of rim 27, also provide for the interweaving of valve spring 21 and valve body 20. Specifically, valve spring 21 can be interlaced with valve body 20, whereby the hub 28 of spring 21 is positioned adjacent one side of valve body 20, while the outer rim portions 27 are positioned to be in contact with the opposite side of valve body 20. This is particularly shown in Figs. 3 and 4. With this structure, the rim 27 of valve spring 21 is in close contact with the rim 22 of body 20. This construction provides for a uniform distribution of the spring forces against the rim 22 of valve body 20. It is important to note that if valve spring 21 were merely positioned on top of valve body 20 and not interwoven therewith, the intimate association between the rim 27 of spring 21 and rim 22 of body 20 would not exist. The advantage of this close association is the uniform distribution of the spring-like forces about the periphery of rim 22, thereby tending to dampen out the vibrations and fluttering of the outlet valve 10.

It should be pointed out that if a valve body 20 alone is used in compressor 1, the valve body will flutter a plurality of times in one compression stroke of piston 3. With this new and improved type valve, the fluttering is considerably reduced to maintain a substantially constant port opening for a predetermined pressure differential, thereby increasing the volumetric efficiency of the compressor 1.

It is further to be noted that a valve body 20, used without a spring 21, cannot withstand at high speeds the constant deflection caused by the pressure differential between compression chamber 18 and outlet manifold 9. It is to be particularly noted that in tests at high speeds, of the order of 1800 R. P. M., which is about 2½ times the normal rated operating speed of such a compressor, the valve body 20 lasts only about 2 hours before breaking. This is caused by the continual hammering of the edges of the valve body 20 upon the valve seat 25. Specifically, the hammering causes the chipping of the edges of the valve body 20 and eventually the breaking of the valve across one portion of the rim. With this new and improved interwoven valve, the spring 21, acting in conjunction with the valve body 20, dampens vibrations produced in valve body 20 and gives a smoother operation, an improved volumetric efficiency, and a longer life to the valve at high operating speeds. It has been noted in tests that under identical pressure and compression a valve body alone, as has been previously described, will last about two hours, while the new and improved interwoven valve has been able to withstand the pressures for over 200 hours of operation.

Because of the high temperatures of compressible fluids which have been compressed over a ratio of about 16:1, it is necessary to temper spring 21 to prevent its deformation. Specifically, it has been found that when spring 21 is formed it should be heated to 370° C. for five hours and then allowed to cool in air. Tests have shown, when spring 21 is formed as shown in Figs. 7 and 8 and treated as above described, that it gives optimum performance.

Modifications of this invention will occur to those skilled in the art and it is desired to be understood, therefore, that this invention is not to be limited to the particular embodiment disclosed, but that the appended claim is meant to cover all the modidfications which are within the spirit and scope of this invention.

What I claim as new and desire to secure by Letters Patent of the United States is:

An interwoven exhaust valve comprising in combination a circular valve body having a rim, a central hub, and a plurality of spokes to support said rim about said hub in a plane therewith, and a dish-shaped valve spring having an annular rim of substantially the same diameter as said valve body, said rim defining a plurality of radial slits dividing said rim into segments, a central hub and a plurality of spokes supporting said segments about said hub to form a dish-shaped spring, said segments being interwoven with the valve body between the spokes thereof whereby the spring hub and spring segments are on opposite sides of said valve body and are biased against said valve body with the hubs of both said elements in alignment.

References Cited in the file of this patent

UNITED STATES PATENTS

| Number | Name | Date |
|---|---|---|
| 2,161,769 | Trask | June 6, 1939 |

FOREIGN PATENTS

| Number | Country | Date |
|---|---|---|
| 646,092 | France | of 1928 |